US011136810B2

(12) United States Patent
Yamamoto et al.

(10) Patent No.: US 11,136,810 B2
(45) Date of Patent: Oct. 5, 2021

(54) WINDOW REGULATOR AND METHOD OF ASSEMBLING THE SAME

(71) Applicant: SHIROKI CORPORATION, Fujisawa (JP)

(72) Inventors: Kenji Yamamoto, Fujisawa (JP); Kazuya Yokoyama, Fujisawa (JP); Kazuki Natsume, Fujisawa (JP)

(73) Assignee: SHIROKI CORPORATION, Fujisawa (JP)

(*) Notice: Subject to any disclaimer, the term of this patent is extended or adjusted under 35 U.S.C. 154(b) by 78 days.

(21) Appl. No.: 16/665,512

(22) Filed: Oct. 28, 2019

(65) Prior Publication Data

US 2020/0131834 A1   Apr. 30, 2020

(30) Foreign Application Priority Data

Oct. 29, 2018 (JP) .............................. JP2018-203014

(51) Int. Cl.
| | | |
|---|---|---|
| *E05F 11/48* | (2006.01) | |
| *E05F 11/38* | (2006.01) | |
| *B60J 1/17* | (2006.01) | |

(52) U.S. Cl.
CPC .............. *E05F 11/382* (2013.01); *B60J 1/17* (2013.01); *E05Y 2900/55* (2013.01)

(58) Field of Classification Search
CPC ..... E05F 11/481; E05F 11/483; E05F 11/485; E05F 11/486; E05F 11/488; E05F 11/385; E05F 15/689; E05Y 2900/55; E05Y 2201/64; E05Y 2800/108; B60J 1/17; B60R 17/00

USPC ........................................................... 49/352
See application file for complete search history.

(56) References Cited

U.S. PATENT DOCUMENTS

| | | | | |
|---|---|---|---|---|
| 5,799,441 | A * | 9/1998 | Shibata ................. | E05F 11/481 49/352 |
| 10,753,137 | B2 * | 8/2020 | Muramatsu ........... | E05F 11/488 |
| 2002/0014039 | A1 * | 2/2002 | Merlet .................. | E05F 11/382 49/440 |
| 2005/0101705 | A1 * | 5/2005 | Castellon ................ | F16C 1/26 524/112 |
| 2005/0229730 | A1 * | 10/2005 | Hori ....................... | E05F 11/382 74/89 |
| 2020/0131823 | A1 * | 4/2020 | Yamamoto ............ | E05F 11/483 |

FOREIGN PATENT DOCUMENTS

| | | | | |
|---|---|---|---|---|
| JP | 2016203812 | A | 12/2016 | |
| JP | 2017203312 | A * | 11/2017 | ............ E05F 11/481 |

* cited by examiner

*Primary Examiner* — Jerry E Redman

(74) *Attorney, Agent, or Firm* — Buchanan Ingersoll & Rooney PC

(57) ABSTRACT

To provide a window regulator and a method of assembling the same, capable of easily supplying grease to a slider shoe and a support portion of a guide rail, the window regulator includes: a guide rail extending in an operation direction of a window glass; and a slider installed to the window glass and guided along the operation direction on the guide rail. The slider has a slider shoe configured to support at least a part of the guide rail, and a grease injection hole configured to inject grease into an internal space of the slider shoe.

6 Claims, 8 Drawing Sheets

WINDOW REGULATOR AND METHOD OF ASSEMBLING THE SAME

FIELD OF THE INVENTION

The present invention relates to a window regulator and a method of assembling the same.

BACKGROUND OF THE INVENTION

Patent Document 1 discloses a method of installing a window regulator in a vehicle, which is easy to handle at the time of shipment and allows a slider to operate smoothly with respect to a guide rail.

In the technique of Patent Document 1, the guide rail has a main wall portion facing the slider and a side wall portion that is bent from the main wall portion and extends toward the slider. In addition, the slider has a main body portion facing the main wall portion of the guide rail and a guide portion that forms a guide trench through which the side wall portion of the guide rail is inserted. Furthermore, the slider has an application portion that applies grease attached to the main wall portion of the guide rail from the main wall portion of the guide rail to the side wall portion as the slider moves up or down.

CITATION LIST

Patent Documents

Patent Document 1: Japanese Unexamined Patent Application Publication No. 2016-203812

SUMMARY OF THE INVENTION

A guide portion (guide trench) of the slider has a slider shoe and supports a side wall portion as a part of the guide rail. Here, when the slider is moved up or down with respect to the guide rail, the slider shoe of the slider may abut (interfere) on a side wall portion as a part of the guide rail, so that abnormal noise or damage may occur as a result. Therefore, it is conceivable to supply (fill or apply) grease to the slider shoe and the support portion of the guide rail.

However, since the slider shoe and the support portion of the guide rail are defined in a complicated and narrow space, it is difficult to spread a sufficient amount of the grease to this space. In addition, for example, in a case where the grease is applied to the side wall portion of the guide rail at the time of shipment, the grease may adhere to an operator's hand while carrying it. In this case, when a plurality of window regulators are stacked, the grease of any one of the window regulators may adhere to another window regulator. Therefore, there is a demand for improvement in handlability.

In view of the problems described above, it is therefore an object of the present invention to provide a window regulator and a method of assembling the same, capable of easily supplying the grease to the slider shoe and the support portion of the guide rail.

According to an aspect of the invention, there is provided a window regulator including: a guide rail extending in an operation direction of a window glass; and a slider installed to the window glass and guided along the operation direction on the guide rail, wherein the slider has a slider shoe configured to support at least a part of the guide rail, and a grease injection hole configured to inject grease into an internal space of the slider shoe.

The slider may have a grease supply portion configured to supply the grease injected into the grease injection hole to the slider shoe and a support portion of the guide rail.

At least two sets of the slider shoes and the grease injection holes may be provided in different locations in the operation direction.

The guide rail may have a main wall portion facing the slider in a vehicle width direction and extending in a front-rear direction, a side wall portion extending from the main wall portion in the vehicle width direction, and a spacing portion extending in the front-rear direction to be separate from the side wall portion. The slider shoe may have a front-rear direction nipping portion configured to nip the side wall portion from the front-rear direction and a vehicle width direction nipping portion configured to nip the spacing portion from the vehicle width direction. The grease injection hole may be formed to communicate with the front-rear direction nipping portion.

The slider may have a grease application portion configured to apply grease to the spacing portion of the guide rail in a location different from those of the slider shoe and the grease injection hole in the operation direction.

The grease application portion may abut on the spacing portion of the guide rail in an elastically deformed state.

According to another aspect of the invention, there is provided a method of assembling the window regulator described above, the method including: a grease injection step of injecting the grease into an internal space of the slider shoe from the grease injection hole; a driving step of driving the slider along the operation direction with respect to the guide rail; and a grease supply step of supplying grease to the slider shoe and a support portion of the guide rail.

According to the present invention, it is possible to provide a window regulator and a method of assembling the same, capable of easily supplying grease to the slider shoe and the support portion of the guide rail.

DESCRIPTION OF EMBODIMENTS

Figure 1:
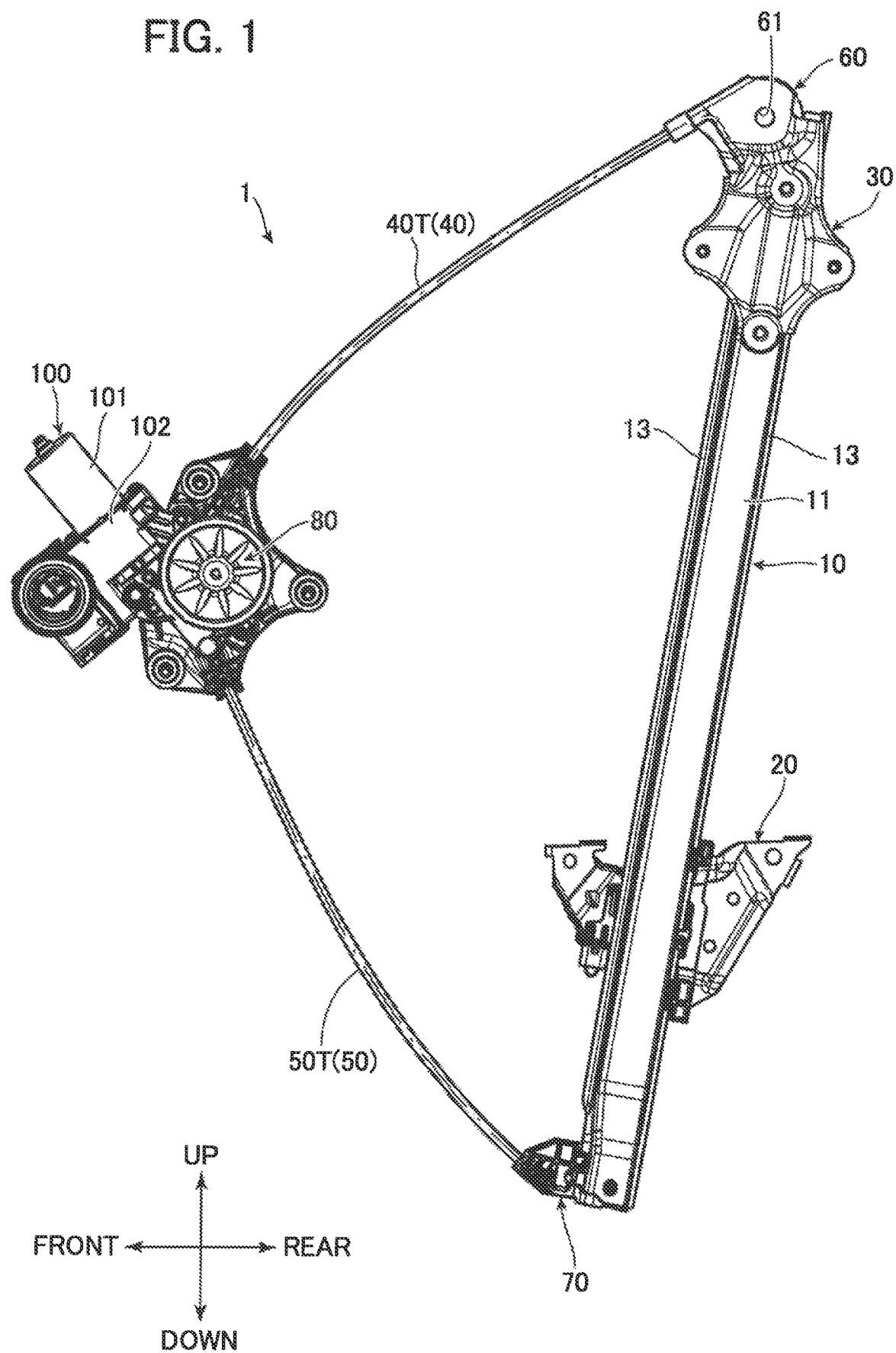
FIG. 1 is a diagram illustrating a window regulator according to an embodiment of the invention as seen from the outside of a vehicle.

A window regulator 1 according to an embodiment of the invention will be described in details with reference to FIGS.

1 to 11. In the following description, directions (such as up, down, front, rear, inside, and outside) are indicated with respect to arrow directions illustrated in the drawings.

<General (Basic) Structure of Window Regulator 1>

Figure 2:
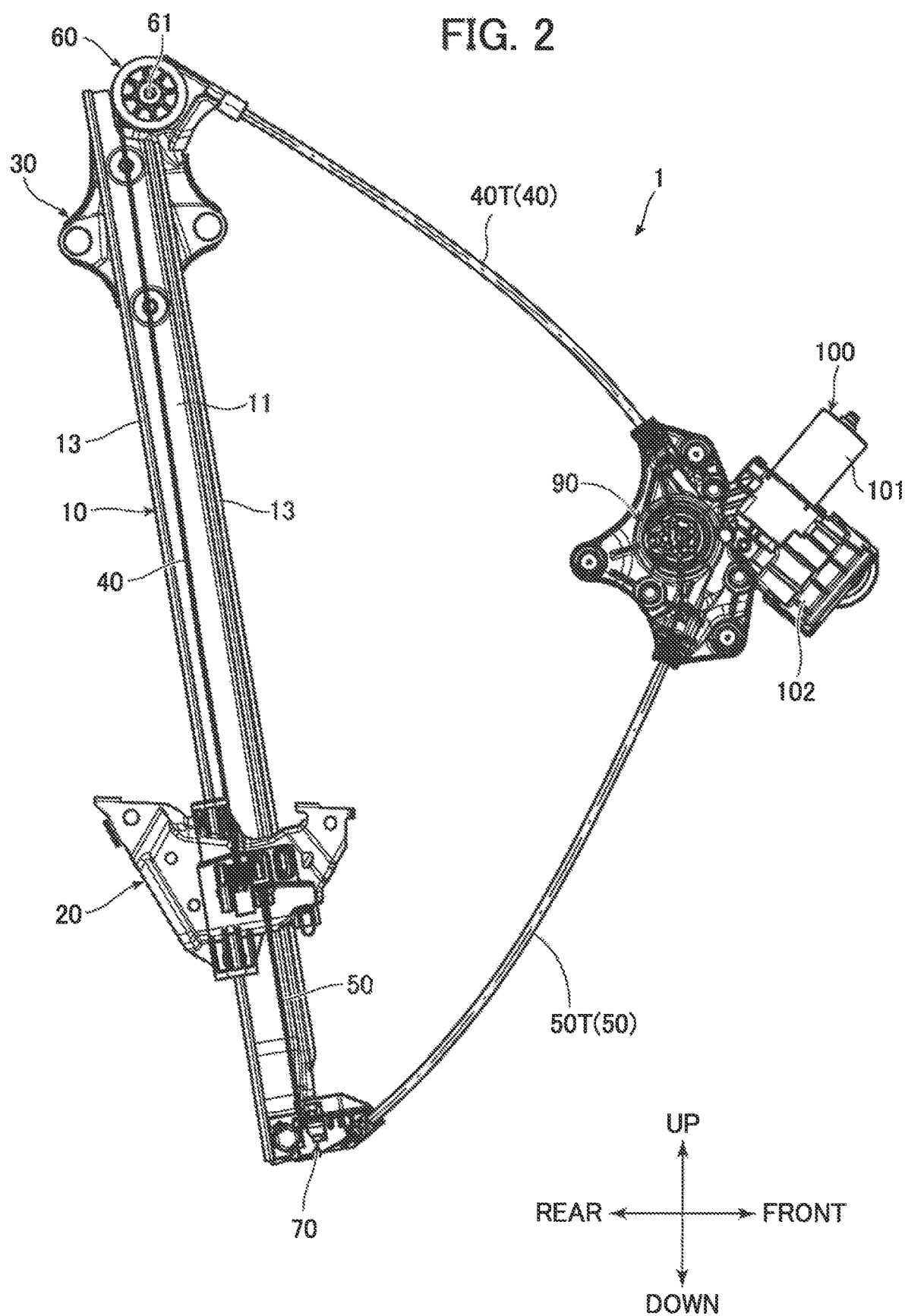
FIG. 2 is a diagram illustrating a window regulator according to an embodiment of the invention as seen from the inside of the vehicle.

As illustrated in FIGS. 1 and 2, the window regulator 1 has a guide rail 10 and a slider 20. The guide rail 10 extends in a vertical direction which is an operation direction of a window glass (not shown). The slider 20 is installed to a window glass (not shown) and is guided to the guide rail 10 along the vertical direction (operation direction). The guide rail 10 is fixed to an inner panel (not shown) of a vehicle using a bracket 30.

One end of each of a pair of wires 40 and 50 for driving the slider 20 with respect to the guide rail 10 in the vertical direction (operation direction) is connected to the slider 20.

A guide pulley 60 provided in the upper end of the guide rail 10 is rotatably supported by a pivot shaft 61 inserted into its pivot shaft hole. The wire 40 extends upward along the guide rail 10 from the slider 20 and is supported by a wire guide trench (not shown) formed on an outer circumferential surface of the guide pulley 60. As the wire 40 advances or retreats, the guide pulley 60 rotates around the pivot shaft 61.

A guide member 70 is provided in the lower end of the guide rail 10. The wire 50 extends downward along the guide rail 10 from the slider 20 and is guided to the guide member 70. The guide member 70 is fixed to the guide rail 10, and the wire 50 is advanceably/retreatably supported by the wire guide trench (not shown) formed in the guide member 70.

The wire 40 released from the guide pulley 60 is inserted into a tubular outer tube 40T and is wound around a driving drum 90 provided in a drum housing 80 to which the outer tube 40T is connected. The wire 50 released from the guide member 70 is inserted into the tubular outer tube 50T and is wound around a driving drum 90 provided in the drum housing 80 to which the outer tube 50T is connected.

A motor unit 100 is installed to the drum housing 80. The motor unit 100 has a motor 101 and a gear box 102 internally equipped with a reduction gear train that transmits rotation of an output shaft of the motor 101 while decelerating it.

The outer tube 40T has one end connected to the guide pulley 60 and the other end connected to the drum housing 80, and the wire 40 is allowed to advance or retreat inside the outer tube 40T having both ends whose positions are determined in this manner. The outer tube 50T has one end connected to the guide member 70 and the other end connected to the drum housing 80, and the wire 50 is allowed to advance or retreat inside the outer tube 50T having both ends whose positions are determined in this manner.

The drum housing 80 is fixed to a door panel (not shown) of the vehicle. As the driving drum 90 is rotated forward or backward by the driving force of the motor 101, a winding amount of one of the wires 40 and 50 around the driving drum 90 increases, and the other of the wires 40 and 50 is fed out from the driving drum 90, so that the slider 20 moves along the guide rail 10 due to a pulling/releasing relationship between the wires 40 and 50. In response to the movement of the slider 20, the window glass (not shown) moves up or down.

<Detailed Structure of Slider 20 and Support Structure to Guide Rail 10>

A detailed structure of the slider 20 and a support structure to the guide rail 10 will be described with reference to FIGS. 3 to 10.

As illustrated in FIGS. 4 and 6 to 9, the guide rail 10 has a main wall portion 11 extending in a front-rear direction to face the slider 20 in a vehicle width direction, a side wall portion 12 extending in the vehicle width direction from the main wall portion 11, and a spacing portion 13 extending in the front-rear direction to be separated from the side wall portion 12, as seen on a longitudinal cross section.

As illustrated in FIG. 2, the main wall portion 11 of the guide rail 10 has a "wire facing surface" that faces the wires 40 and 50 along the vertical direction (operation direction). The "wire facing surface" may refer to the entire main wall portion 11 of the guide rail 10 or may refer to a part of the main wall portion 11 of the guide rail 10 located under (immediately under) the wires 40 and 50.

As illustrated in FIGS. 6 to 9, the main wall portion 11 of the guide rail 10 has a "slider facing surface" that faces at least a part of the slider 20 (for example, a slider shoe forming portion 310 or a stopper piece 333 or 343 described below). The "slider facing surface" may refer to the entire main wall portion 11 of the guide rail 10 or a part of the main wall portion 11 of the guide rail 10 located at least partially under (immediately under) the slider 20.

The slider 20 is formed by integrally molding a metal slider 200 and a resin slider 300. The metal slider 200 and the resin slider 300 are formed, for example, by insert-molding.

As illustrated in FIGS. 3 and 6 to 9, the resin slider 300 has a slider shoe forming portion 310 as a main body portion facing the main wall portion (slider facing surface) 11 of the guide rail 10 abuttably from the vehicle width direction. In the slider shoe forming portion 310, a slider shoe 311 that supports the side wall portion 12 and the spacing portion 13 as at least a part of the guide rail 10 is formed.

Figure 3:
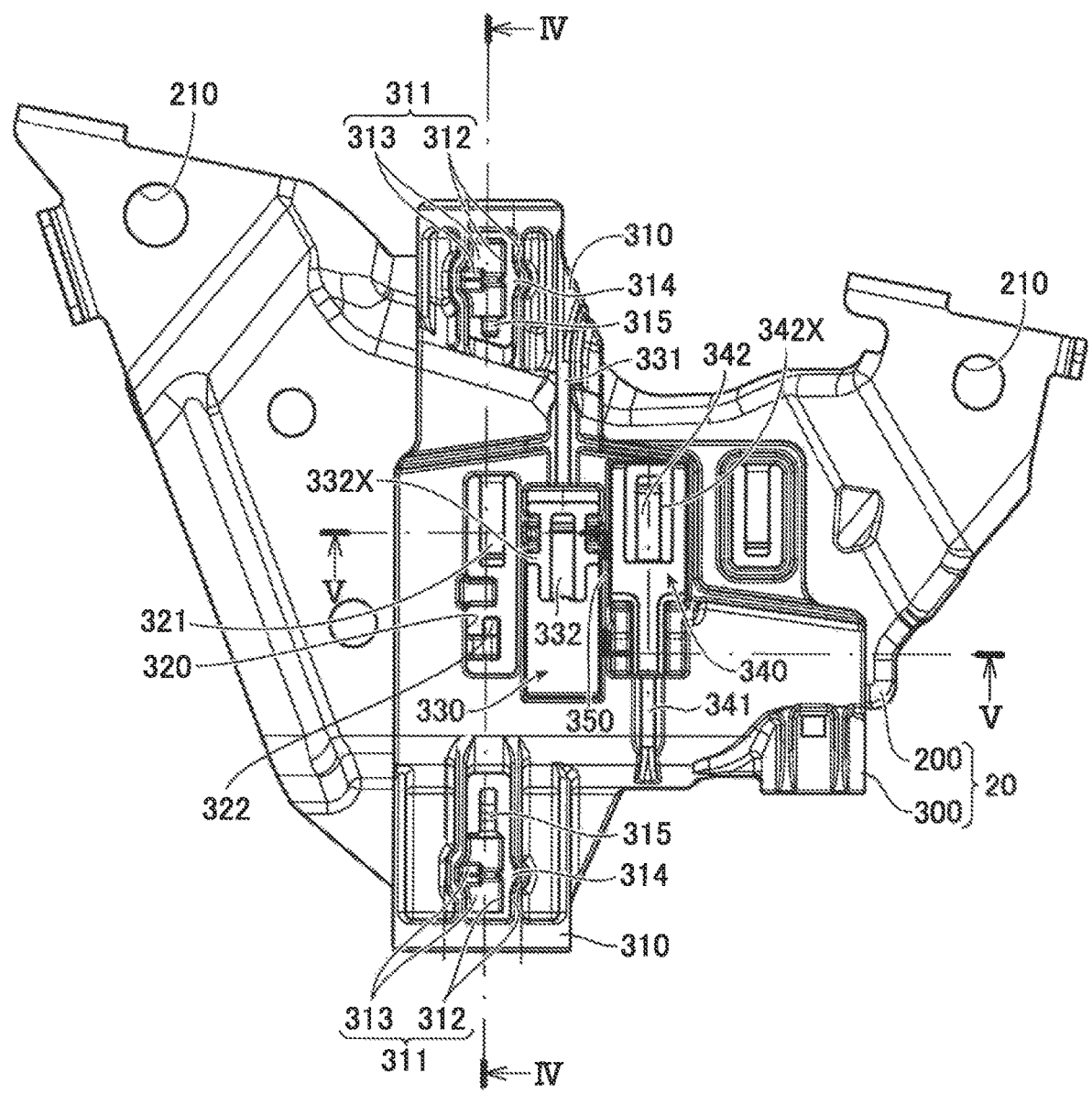
FIG. 3 is a diagram illustrating a slider according to an embodiment of the invention as seen from the inside of the vehicle.
Figure 8:
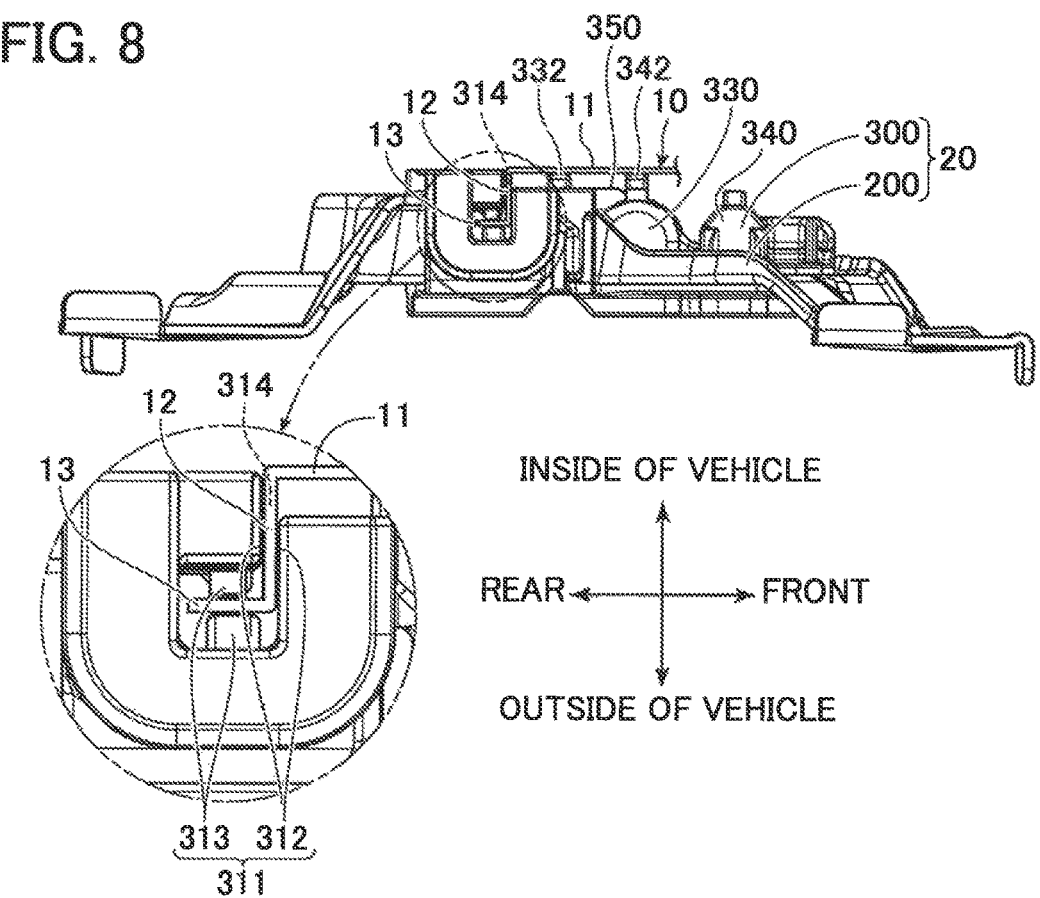
FIG. 8 is a top view illustrating a slider according to an embodiment of the invention.
Figure 9:
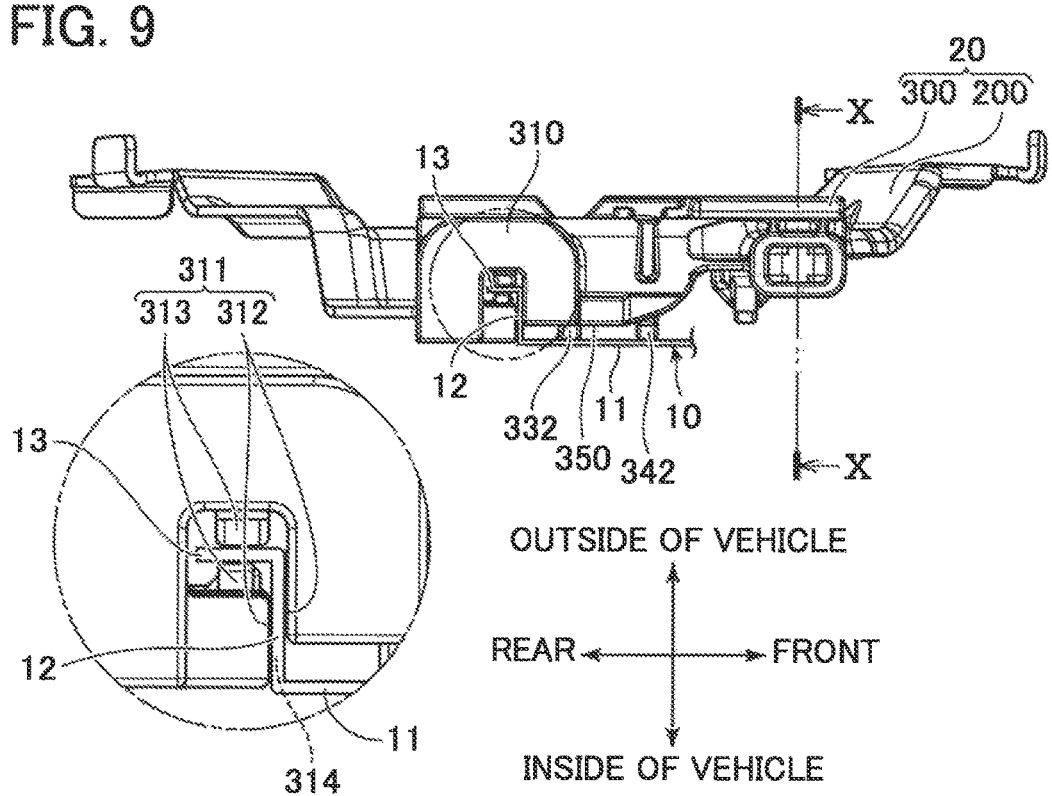
FIG. 9 is a bottom view illustrating a slider according to an embodiment of the invention.

As illustrated in FIGS. 3, 8, and 9, the slider shoe 311 has a front-rear direction nipping portion 312 that nips the side wall portion 12 of the guide rail 10 from the front-rear direction and a vehicle width direction nipping portion 313 that nips the spacing portion 13 of the guide rail 10 from the vehicle width direction.

As illustrated in FIGS. 3 to 5, 8, and 9, the slider shoe forming portion 310 of the resin slider 300 has a grease injection hole 314 for injecting grease into the internal space of the slider shoe 311. The grease injection hole 314 is formed to communicate with the front-rear direction nipping portion 312.

Figure 4:
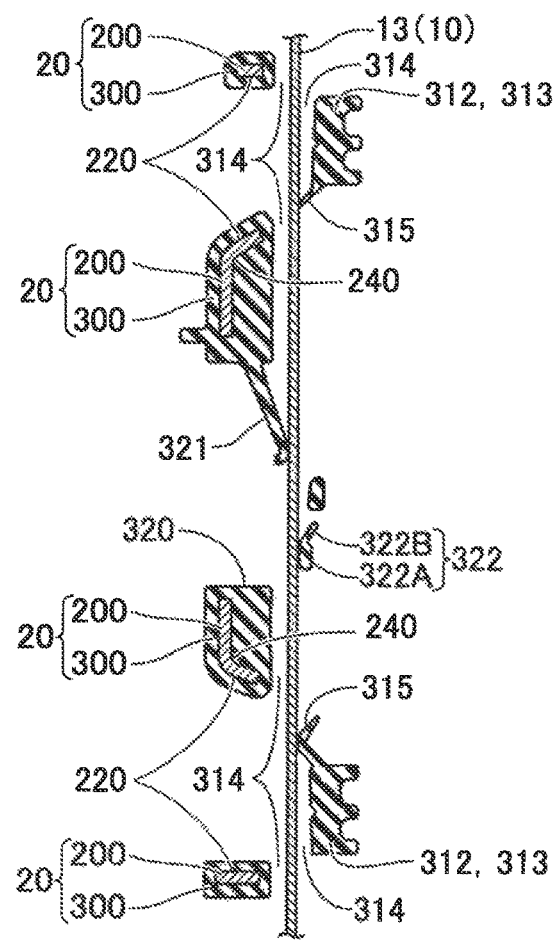
FIG. 4 is a cross-sectional view taken along a line IV-IV of FIG. 3.
Figure 5:
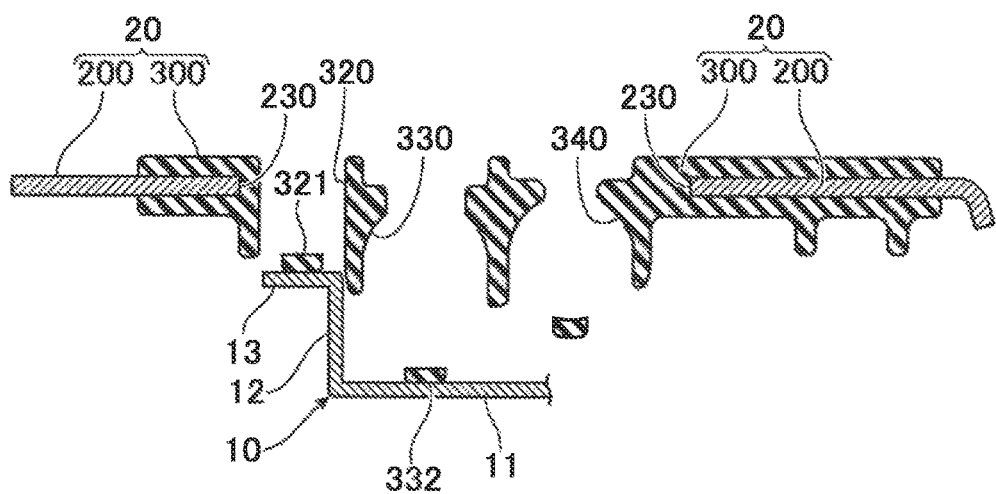
FIG. 5 is a cross-sectional view taken along a line V-V of FIG. 3.

As illustrated in FIGS. 3 to 5, the slider shoe forming portion 310 of the resin slider 300 has a grease application portion 315 for applying (supplying) the grease injected into the grease injection hole 314 into the slider shoe 311 and the support portion of the guide rail 10 (for example, the nipping portion of the side wall portion 12 by the front-rear direction nipping portion 312 or the nipping portion of the spacing portion 13 by the vehicle width direction nipping portion 313) continuously to the front-rear direction nipping portion 312 and the vehicle width direction nipping portion 313. This grease application portion 315 includes a cantilever-shaped spring piece extending toward the spacing portion 13 of the guide rail 10, and a tip side of the spring piece abuts on the spacing portion 13 of the guide rail 10 in an elastically deformed state (see FIGS. 4 and 5). Note that the tip side of the spring piece of the grease application portion 315 may not elastically abut on the spacing portion 13 of the guide rail 10, and may face the spacing portion 13, for example, with a minute clearance.

Two sets of the slider shoe forming portions 310 (including the slider shoe 311, the front-rear direction nipping portion 312, the vehicle width direction nipping portion 313, the grease injection hole 314, and the grease application portion 315) configured in this manner are provided while differently setting their locations of the vertical direction (operation direction). Note that the number of the sets of the slider shoe forming portions 310 is not limited to "two", but three or more sets may be provided (at least two sets may be provided).

As illustrated in FIGS. 3 to 5, the resin slider 300 has an opening 320 located between two upper and lower sets of the slider shoe forming portions 310. The opening 320 internally has a grease application portion 321 for applying grease to the spacing portion 13 of the guide rail 10. The grease application portion 321 includes a cantilever-shaped spring piece extending toward the spacing portion 13 of the guide rail 10, and a tip side of this spring piece abuts on the spacing portion 13 of the guide rail 10 in an elastically deformed state (see FIGS. 4 and 5). Note that the tip side of the spring piece of the grease application portion 321 may not elastically abut on the spacing portion 13 of the guide rail 10, and may face the spacing portion 13, for example, with a minute clearance.

The opening 320 internally has a grease application portion 322 for applying grease to the spacing portion 13 of the guide rail 10 from a surface opposite to the grease application portion 321 (the surface of the side where a pair of grease application portions 315 are formed). This grease application portion 322 has a first part 322A coming into contact with (elastically abutting on) the spacing portion 13 of the guide rail 10 and a second part 322B extending to widen a distance from the first part 322A to the spacing portion 13 of the guide rail 10. The grease application portion 322 slides along the vertical direction (operation direction) while the grease is stored between the spacing portion 13 of the guide rail 10 and the second part 322B, so that the grease can be applied to the spacing portion 13 of the guide rail 10.

The opening 320 and the grease application portion 321 may not be located between two upper and lower sets of the slider shoe forming portions 310 (slider shoes 311), and may be placed at least in different positions from those of the two sets of the slider shoe forming portions 310 (slider shoes 311) in the vertical direction (operation direction). In addition, the grease applied to the spacing portion 13 of the guide rail 10 using the grease application portion 321 may include, for example, an excess of the grease injected into the upper and lower grease injection holes 314, and the grease to be applied to the spacing portion 13 of the guide rail 10 using the grease application portion 321 may also be supplied through the opening 320.

As illustrated in FIGS. 3 and 5, the resin slider 300 is located slightly ahead of two upper and lower sets of the slider shoes 311 (in the front-rear direction intersecting the vertical direction as the operation direction), and has a wire end housing portion 330 for housing a wire end (not shown) of the wire 40 and a wire end housing portion 340 for housing a wire end (not shown) of the wire 50. The wire end housing portions 330 and 340 define a semi-cylindrical housing space that is relatively short in the front-rear direction and relatively long in the vertical direction and has a certain length in the vehicle width direction. The wire end housing portions 330 and 340 are partially overlapped by offsetting their positions in the vertical direction and are arranged in parallel by offsetting their positions in the front-rear direction.

As illustrated in FIG. 3, a wire insertion trench 331 into which the wire 40 is inserted when the wire end of the wire 40 (not shown) is housed in the wire end housing portion 330 is formed immediately over the wire end housing portion 330 to communicate with the wire end housing portion 330. A wire insertion trench 341 into which the wire 50 is inserted when the wire end of the wire 50 (not shown) is housed in the wire end housing portion 340 is formed immediately under the wire end housing portion 340.

As illustrated in FIGS. 6 to 9, the wire end housing portion 330 internally has a grease application portion 332 located on the same vertical line as that of the wire insertion trench 331 (the wire 40 inserted thereto). The grease application portion 332 has a function of applying the grease along the vertical direction (operation direction) on the surface of the main wall portion 11 of the guide rail 10 at least facing the wire 40 (wire facing surface). The grease application portion 332 includes a cantilever-shaped spring piece extending toward the main wall portion (wire facing surface) 11 of the guide rail 10, and the tip side of the spring piece abuts on the main wall portion (wire facing surface) 11 of the guide rail 10 in an elastically deformed state. Note that the tip side of the spring piece of the grease application portion 332 may not elastically abut on the main wall portion (wire facing surface) 11 of the guide rail 10, and may face the main wall portion 11, for example, with a minute clearance.

Figure 6:
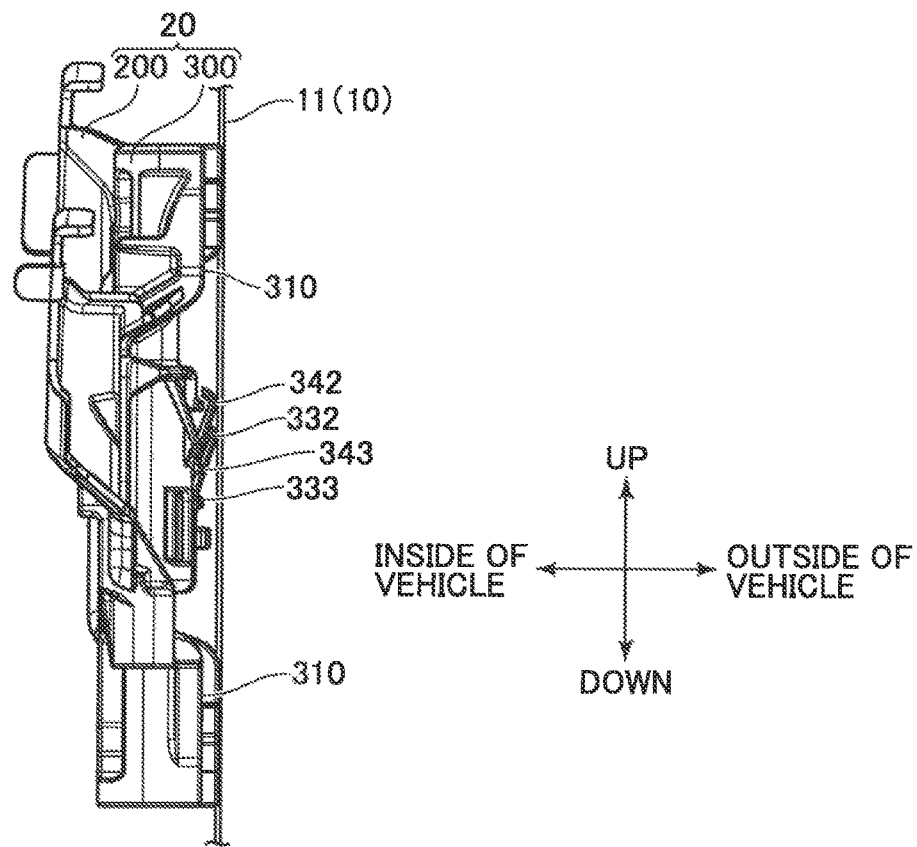
FIG. 6 is a front view illustrating a slider according to an embodiment of the invention.
Figure 7:
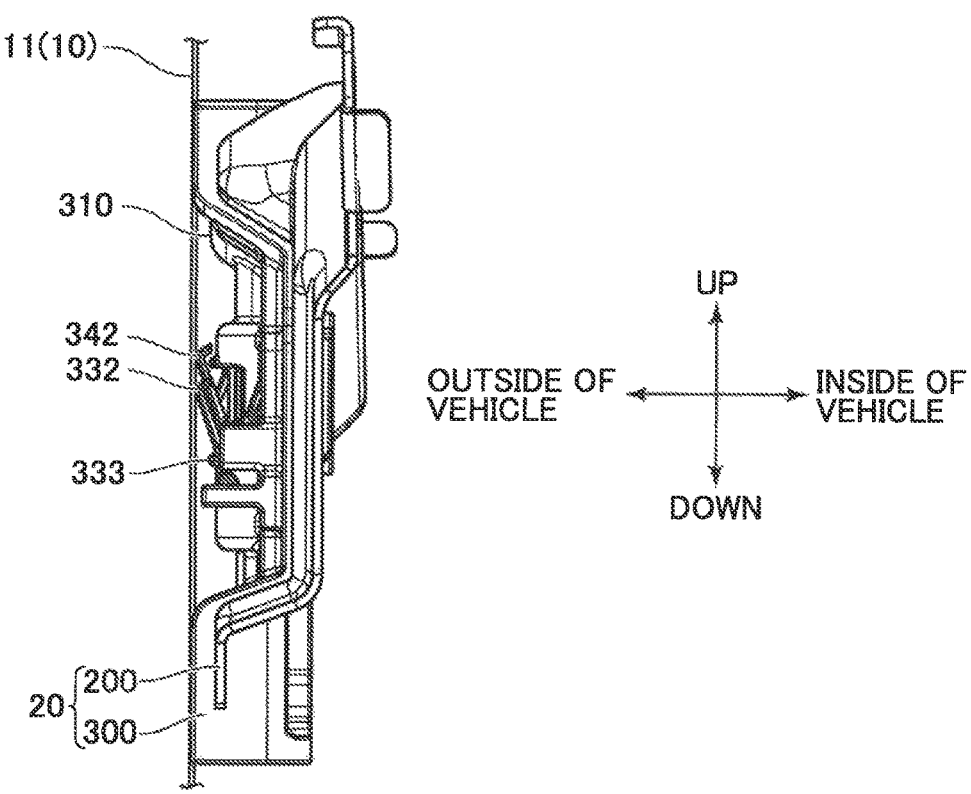
FIG. 7 is a rear view illustrating a slider according to an embodiment of the invention.

A stopper piece (stopper) 333 for regulating elastic deformation of the spring piece is formed in the basal end side of the spring piece of the grease application portion 332 (see FIGS. 6 and 7). This stopper piece 333 prevents the spring piece of the grease application portion 332 from being bent beyond a critical stress value (the spring piece is damaged due to excessive bending). Note that the stopper piece 333 may be formed in the tip side of the spring piece of the grease application portion 332 or in both the basal end side and the tip side of the spring piece of the grease application portion 332.

As illustrated in FIGS. 6 to 9, a grease application portion 342 located on the same vertical line as that of the wire insertion trench 341 (the wire 50 inserted therethrough) is formed inside the wire end housing portion 340. The grease application portion 342 has a function of applying the grease along the vertical direction (operation direction) on at least the surface (wire facing surface) of the main wall portion 11 of the guide rail 10 facing the wire 50. The grease application portion 342 includes a cantilever-shaped spring piece extending toward the main wall portion (wire facing surface) 11 of the guide rail 10, and the tip side of the spring piece abuts on the main wall portion (wire facing surface) 11 of the guide rail 10 in an elastically deformed state. Note that the tip side of the spring piece of the grease application portion 342 may not elastically abut on the main wall portion (wire facing surface) 11 of the guide rail 10, and may face the main wall portion 11, for example, with a minute clearance.

A stopper piece (stopper) 343 for regulating elastic deformation of the spring piece is formed in the basal end side of the spring piece of the grease application portion 342 (see FIGS. 6 and 7). This stopper piece 343 prevents the spring piece of the grease application portion 342 from being bent beyond a critical stress value (the spring piece is damaged due to excessive bending). Note that the stopper piece 343 may be formed in the tip side of the spring piece of the grease application portion 342 or in both the basal end side and the tip side of the spring piece of the grease application portion 342.

The grease application portions 332 and 342 are provided in different locations in the vertical direction (operation direction) from that of the main body portion (such as the slider shoe forming portion 310 or the stopper piece 333 or 343) of the resin slider 300 facing abuttably on the main wall portion (slider facing surface) 11 of the guide rail 10 from the vehicle width direction. For example, the grease application portions 332 and 342 are provided between a pair of upper and lower slider shoe forming portions 310. The grease application portions 332 and 342 apply the grease along the vertical direction (operation direction) on the main wall portion (slider facing surface) 11 of the guide rail 10.

The grease application portions 332 and 342 extends from a location far from the main wall portion (slider facing surface) 11 of the guide rail 10 relative to the main body portion (such as the slider shoe forming portion 310 or the stopper piece 333 or 343) of the resin slider 300 toward a location close to the main wall portion (slider facing surface) 11 of the guide rail 10 relative to the main body portion (such as the slider shoe forming portion 310 or the stopper piece 333 or 343) of the resin slider 300.

The grease application portions 332 and 342 are provided in different locations in the front-rear direction (direction intersecting the vertical direction as the operation direction), and a grease storage groove 350 extending in the vertical direction is formed between the grease application portions 332 and 342 (see FIGS. 3, 8, and 9). The grease storage groove 350 stores the grease leaking from the grease application portion 332 or 342 in the front-rear direction. Then, in a case where vibration is applied to the window regulator 1 as the grease between the grease application portions 332 and 342 and the main wall portion (including the wire facing surface and the slider facing surface) 11 of the guide rail 10 is reduced, and/or in a case where the grease application portion 332 or 342 is shaken in the front-rear direction as the slider 20 moves up or down, the grease stored in the grease storage groove 350 is scraped off with the grease application portions 332 and 342, and the grease is supplied (recharged) to the main wall portion (including the wire facing surface or the slider facing surface) 11 of the guide rail 10.

The grease application portions 332 and 342 are provided in different locations in the vertical direction (operation direction) (vertically offset). As a result, an excess of the grease (the grease leaking from the application) on one of the grease application portions 332 and 342 where the grease has been initially applied is supplied to the other grease application portion where the grease is applied afterward. As a result, it is possible to apply the grease with high efficiency.

The grease application portions 332 and 342 are provided in different locations from that of the slider shoe 311 in the front-rear direction (the direction intersecting the vertical direction as the operation direction). That is, as seen in the front-rear direction, the slider 20 is supported by the guide rail 10 on three points, that is, the slider shoe 311, the grease application portion 332, and the grease application portion 342. Therefore, it is possible to stably support the slider 20 while reliably preventing deviation (rotation).

When the window regulator 1 configured as described above is assembled, each element of the window regulator 1 is assembled in the door panel (not shown) of the vehicle. Then, grease balls are supplied to a single point or a plurality of points on an elevation/lowering locus of the grease application portions 332 and 342 instead of the entire main wall portion (including the wire facing surface and the slider facing surface) 11 of the guide rail 10. In addition or instead, the grease may also be supplied to openings 332X and 342X (see FIG. 1) formed around the grease application portions 332 and 342. Furthermore, the grease is injected from a pair of vertical grease injection holes 314 into an internal space of the slider shoe 311.

As the grease supply or grease injection described above is completed, the wires 40 and 50 are driven by rotating the driving drum 90 forward or backward using the motor unit 100, so that the slider 20 is driven along the vertical direction (operation direction) with respect to the guide rail 10.

Then, using the grease application portions 332 and 342, the grease is applied along the vertical direction (operation direction) on the main wall portion (including the wire facing surface and the slider facing surface) 11 of the guide rail 10. In addition, the grease injected from the grease injection hole 314 is supplied to the slider shoe 311 and the support portion of the guide rail 10 (for example, the nipping portion of the side wall portion 12 formed by the front-rear direction nipping portion 312 or the nipping portion of the spacing portion 13 formed by the vehicle width direction nipping portion 313) in the internal space of the slider shoe 311. The effect of supplying the grease is more significantly exhibited as the grease application portion 315 supplies the grease injected into the grease injection hole 314 to the slider shoe 311 and the support portion of the guide rail 10 (for example, the nipping portion of the side wall portion 12 formed by the front-rear direction nipping portion 312 or the nipping portion of the spacing portion 13 formed by the vehicle width direction nipping portion 313). Note that the grease application portion 315 is not an indispensable element, and some grease supply effects are obtained even by omitting the grease application portion 315.

In this manner, the grease can be easily applied to the main wall portion (including the wire facing surface and the slider facing surface) 11 of the guide rail 10. In addition, it is possible to easily supply the grease to the slider shoe 311 and the support portion of the guide rail 10 (for example, the nipping portion of the side wall portion 12 formed by the front-rear direction nipping portion 312 or the nipping portion of the spacing portion 13 formed by the vehicle width direction nipping portion 313).

By forming the grease application portions 332 and 342 inside the wire end housing portions 330 and 340, it is possible to improve space efficiency while maintaining the strength of the slider base 20 without affecting wiring of the wires 40 and 50. In addition, by providing the grease application portions 332 and 342 in the vicinity of the place where the position of the wire end is regulated, it is possible to reliably apply the grease to the main wall portion (including the wire facing surface and the slider facing surface) 11 of the guide rail 10.

Meanwhile, in the slider 20 according to this embodiment, the parts sliding along the guide rail 10 belong to the resin slider 300, and the other functional parts belong to the metal slider 200. For example, the metal slider 200 has a fastening bolt insertion hole 210 for inserting a fastening bolt (not shown) fixed to the window glass (not shown) (see FIGS. 3, 11A, and 11B).

Figure 11A:
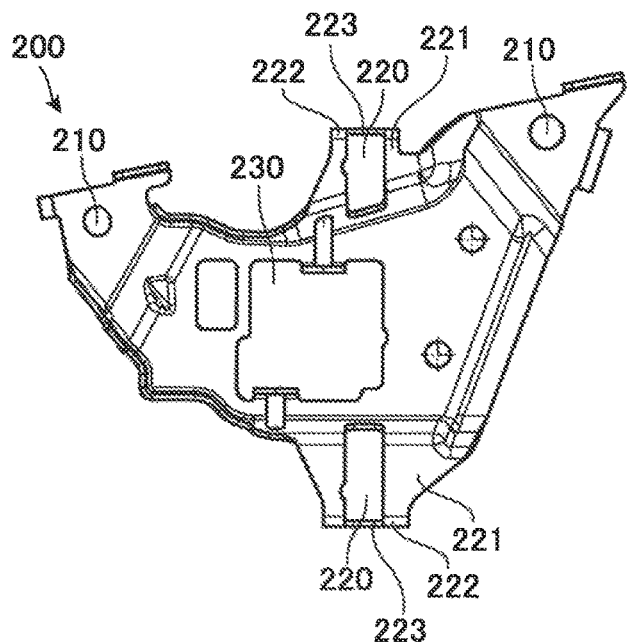
FIGS. 11A to 11C are diagrams illustrating an integral structure of a metal slider as seen from the outside, the inside, and the lateral side of the vehicle.
Figure 11B:
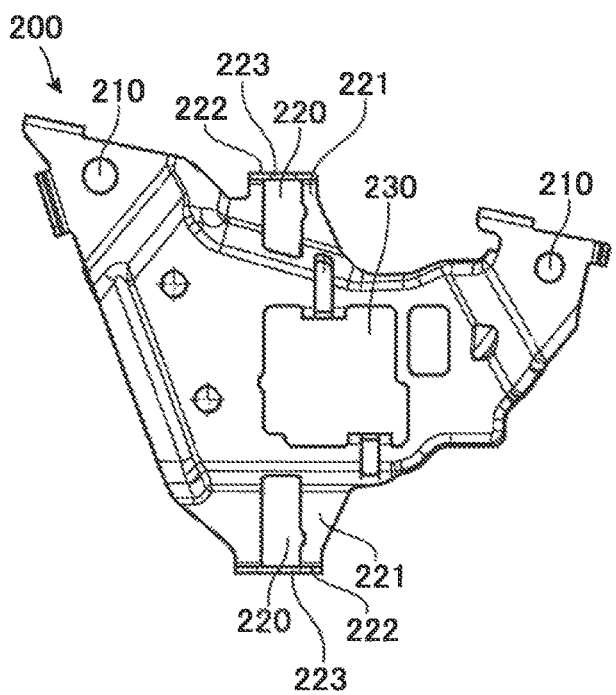

For example, as illustrated in FIGS. 4, 11A, and 11B, the metal slider 200 has a pair of slider shoe formation thinning portions (thinning portion) 220 that are separated in the vertical direction and penetrate in the vehicle width direction. In addition, as illustrated in FIGS. 5, 11A, and 11B, the metal slider 200 has a wire end housing portion formation thinning portion (thinning portion) 230 that penetrate in the vehicle width direction. Furthermore, the metal slider 200 may have a thinning portion other than the slider shoe formation thinning portion 220 and the wire end housing portion formation thinning portion 230.

The resin slider 300 enters the slider shoe formation thinning portion 220 and the wire end housing portion formation thinning portion 230 of the metal slider 200 and nips the circumferences of the slider shoe formation thinning portion 220 and the wire end housing portion formation thinning portion 230 from the vehicle width direction (see FIGS. 4 and 5). The slider shoe 311 is formed in a part of the resin slider 300 entering the slider shoe formation thinning portion 220 of the metal slider 200. The wire end housing portions 330 and 340 are formed in a part of the resin slider 300 entering the wire end housing portion formation thinning portion 230 of the metal slider 200.

By forming the part sliding along the guide rail 10 with the resin slider 300 in this manner, it is possible to improve slidability when the slider 20 is driven with respect to the guide rail 10. In addition, by forming the thinning portions 220 and 230 penetrating in the vehicle width direction in the metal slider 200, causing the resin slider 300 to enter the thinning portions 220 and 230 of the metal slider 200, and causing the resin slider 300 to nip the circumferences of the thinning portions 220 and 230 in the vehicle width direction, it is possible to improve durability when the slider 20 is driven with respect to the guide rail 10.

According to this embodiment, the slider shoe 311 of the resin slider 300 has a complicated shape having the front-rear direction nipping portion 312, the vehicle width direction nipping portion 313, the grease injection portion 314, or the grease application portion 315. However, it is considered that one of the factors that enables molding of such a complicated shape is that the slider shoe 311 of the resin slider 300 is molded to bury the inside and the circumference of the slider shoe formation thinning portion 220 of the metal slider 200.

Similarly, although the wire end housing portions 330 and 340 of the resin slider 300 have a complicated shape including the grease application portions 332 and 342, it is considered that one of the factors that enables molding of such a complicated shape is that the wire end housing portions 330 and 340 of the resin slider 300 are molded to bury the inside and the circumference of the wire end housing portion formation thinning portion 230 of the metal slider 200.

Figure 10:
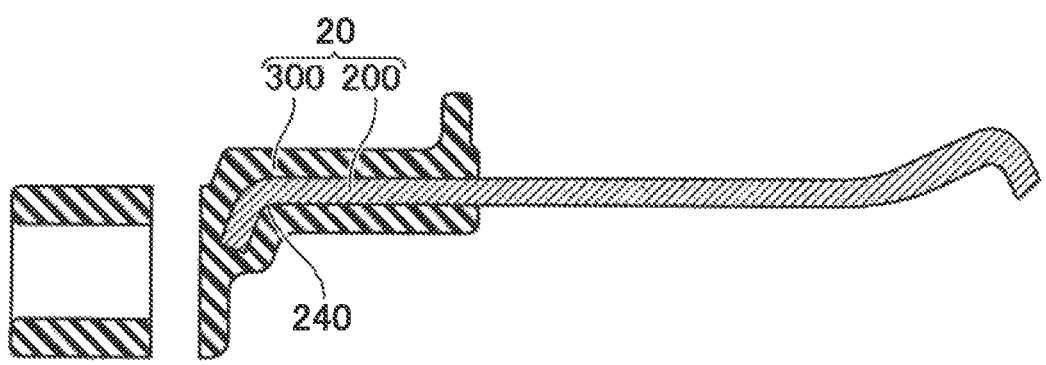
FIG. 10 is a cross-sectional view taken along a line X-X of FIG. 9.

As illustrated in FIGS. 4, 10, and the like, the metal slider 200 has a bent portion 240 bent in at least one of the front-rear direction, the vertical direction, and the vehicle width direction, and the resin slider 300 nips the bent portion 240 of the metal slider 200 from both sides (mountain fold side and valley fold side). For this reason, it is possible to guarantee the strength by the bent portion 240 of the metal slider 200 and further reinforce the strength using the nipping portion of the resin slider 300.

Figure 11C:
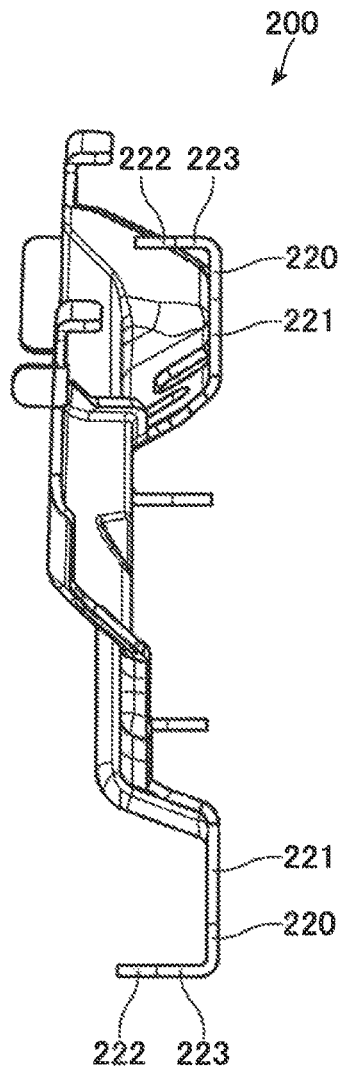

As illustrated in FIGS. 11A to 11C (particularly, in FIG. 11C), the metal slider 200 has the bent portion, including a substantially vertical surface 221 on which the upper and lower slider shoe formation thinning portions 220 are formed and a substantially horizontal surface 222 obtained by substantially perpendicularly bending the substantially vertical surface 221. In addition, the substantially horizontal surface 222 of the bent portion has a communication thinning portion 223 communicating with the slider shoe formation thinning portion 220. By forming the slider shoe formation thinning portion 220 and the communication thinning portion 223 communicating therewith (that is, "communication thinning space portion") to match the bent portion including the substantially vertical surface 221 and the substantially horizontal surface 222 of the metal slider 200, and providing the slider shoe 311 of the resin slider 300 so as to enter the communication thinning space portion, it is possible to further improve the strength relative to the slider 20.

By forming the metal slider 200 and the resin slider 300 having the aforementioned configurations on an insert-molding basis, the nipping portion of the metal slider 200 using the resin slider 300 (including a biting portion) can be arranged in a simple shape (for example, a straight shape) with reduced influence of the shrinkage, on the basis of a fact that the metal slider 200 is not shrunken, but the resin slider 300 is shrunken.

In the slider 20 (including the metal slider 200 and the resin slider 300) according to this embodiment, the metal slider 200 has the slider shoe formation thinning portion (thinning portion) 220 penetrating in the vehicle width direction, and the resin slider 300 has the slider shoe 311 that supports at least a part of the guide rail 10 (for example, the side wall portion 12 and the spacing portion 13) in a part entering the slider shoe formation thinning portion (thinning portion) 220.

As described above, the slider shoe 311 of the resin slider 300 has a complicated shape including the front-rear direction nipping portion 312, the vehicle width direction nipping portion 313, the grease injection hole 314, or the grease application portion 315. However, by forming such complicated elements in a portion of the metal slider 200 entering the slider shoe formation thinning portion (thinning portion) 220, it is possible to improve moldability of the resin slider 300.

That is, in order to manufacture the resin slider 300 having the slider shoe 311, press molding may be performed by moving a pair of molds (not shown) corresponding to the vehicle width direction (the inside and the outside of the vehicle) close to each other in a press direction. Then, the pair of molds may be directly separated in the press direction without sliding them perpendicularly to the press direction. In this manner, so-called "slideless" press molding using a pair of molds can be performed. Therefore, it is possible to miniaturize or simplify the press molding device and improve moldability of the resin slider 300.

In the slider 20 (including the metal slider 200 and the resin slider 300) according to this embodiment, the metal slider 200 has the wire end housing portion formation thinning portion (thinning portion) 230 penetrating in the vehicle width direction, and the resin slider 300 has the wire end housing portions 330 and 340 that house the wire ends of the wires 40 and 50 used to drive the slider 20 with respect to the guide rail 10 in the vertical direction (operation direction) in the part entering the wire end housing portion formation thinning portion (thinning portion) 230.

Although the wire end housing portions 330 and 340 of the resin slider 300 have complicated shapes having the grease application portions 332 and 342 as described above, it is possible to improve moldability of the resin slider 300 by forming such complicated elements in a part of the metal slider 200 entering the wire end housing portion formation thinning portion (thinning portion) 230.

That is, in order to manufacture the resin slider 300 having the wire end housing portions 330 and 340, press molding may be performed by moving a pair of molds (not shown) corresponding to the vehicle width direction (the inside and the outside of the vehicle) close to each other in the press direction. Then, the pair of molds may be directly separated in the press direction without sliding them perpendicularly to the press direction. In this manner, so-called "slideless" press molding using a pair of molds can be performed. Therefore, it is possible to miniaturize or simplify the press molding device and improve moldability of the resin slider 300.

Note that the slider 20 may not include two elements, including the metal slider 200 and the resin slider 300, but may include only the resin slider. Then, the thinning portion penetrating in the vehicle width direction may be formed in the resin slider. In this case, the resin slider may have a slider shoe that supports at least a part of the guide rail in the part entering the thinning portion and/or the wire end housing portion that houses the wire end of the wire used to drive the slider with respect to the guide rail in the operation direction in the part entering the thinning portion. In such a modification, it is possible to perform slideless press molding of the resin slider and improve moldability of the resin slider.

In the embodiment described above, the two wires 40 and 50 are located over (immediately over) the main wall portion 11 of the guide rail 10. Alternatively, only one of the two wires 40 and 50 may be located over (immediately over) the main wall portion 11 of the guide rail 10.

REFERENCE SIGNS LIST 1 window regulator
10 guide rail
11 main wall portion (wire facing surface, slider facing surface)
12 side wall portion
13 spacing portion
20 slider
30 bracket
40, 50 wire
40T, 50T outer tube
60 guide pulley
61 pivot shaft
70 guide member
80 drum housing
90 driving drum
100 motor unit
101 motor
102 gear box
200 metal slider
210 fastening bolt insertion hole
220 slider shoe formation thinning portion (thinning portion)
221 substantially vertical surface
222 substantially horizontal surface
223 communication thinning portion
230 wire end housing portion formation thinning portion (thinning portion)
240 bent portion
300 resin slider
310 slider shoe forming portion (main body portion)
311 slider shoe
312 front-rear direction nipping portion
313 vehicle width direction nipping portion
314 grease injection hole
315 grease application portion
320 opening
321 grease application portion
322 grease application portion
322A first part
322B second part
330, 340 wire end housing portion
331, 341 wire insertion trench
332, 342 grease application portion
332X, 342X opening
333, 343 stopper piece (main body portion, stopper)
350 grease storage groove

What is claimed is:

1. A window regulator comprising:
a guide rail extending in an operation direction of a window glass; and
a slider installed to the window glass and guided along the operation direction on the guide rail, wherein
the slider has:
a slider shoe configured to support at least a part of the guide rail; and
a grease injection hole configured for injection of grease into an internal space of the slider shoe,
the guide rail has a main wall portion facing the slider in a vehicle width direction and extending in a front-rear direction, a side wall portion extending from the main wall portion in the vehicle width direction, and a spacing portion extending in the front-rear direction to be separate from the side wall portion,
the slider shoe has a front-rear direction nipping portion configured to nip the side wall portion from the front-rear direction and a vehicle width direction nipping portion configured to nip the spacing portion from the vehicle width direction, and
the grease injection hole is formed to communicate with the front-rear direction nipping portion.

2. The window regulator according to claim 1, wherein the slider has a grease supply portion configured to supply the grease injected into the grease injection hole to the slider shoe and a support portion of the guide rail.

3. The window regulator according to claim 1, wherein at least two sets of the slider shoes and the grease injection holes are provided in different locations in the operation direction.

4. The window regulator according to claim 1, wherein the slider has a grease application portion configured to apply grease to the spacing portion of the guide rail in a location different from those of the slider shoe and the grease injection hole in the operation direction.

5. The window regulator according to claim 4, wherein the grease application portion abuts on the spacing portion of the guide rail in an elastically deformed state.

6. A method of assembling the window regulator according to claim 1, the method comprising:
a grease injection step of injecting the grease into an internal space of the slider shoe from the grease injection hole;
a driving step of driving the slider along the operation direction with respect to the guide rail; and
a grease supply step of supplying grease to the slider shoe and a support portion of the guide rail.

* * * * *